C. G. HASTINGS.
TUNNELING DEVICE.
APPLICATION FILED MAY 11, 1918.

1,413,729.

Patented Apr. 25, 1922.
6 SHEETS—SHEET 1.

Fig. 1

Witnesses
Rudolph J. Berg.
Charles Hills Jr.

Inventor
CORNELIUS G. HASTINGS.
by Charles Hills Atty.

UNITED STATES PATENT OFFICE.

CORNELIUS G. HASTINGS, OF GLENDALE, CALIFORNIA.

TUNNELING DEVICE.

1,413,729. Specification of Letters Patent. Patented Apr. 25, 1922.

Application filed May 11, 1918. Serial No. 233,862.

*To all whom it may concern:*

Be it known that I, CORNELIUS G. HASTINGS, a citizen of the United States, and a resident of the city of Glendale, in the county of Los Angeles and State of California, have invented certain new and useful Improvements in a Tunneling Device; and I do hereby declare that the following is a full, clear, and exact description of the same, reference being had to the accompanying drawings, and to the numerals of reference marked thereon, which form a part of this specification.

My invention has reference more particularly to a tunneling device or shield for use in making the opening in which the tunnel is constructed, and is particularly adapted to obviate the difficulties heretofore experienced in operating in loose earth such as sand and similar materials, and my invention also has reference to a reinforced tunnel wall construction for facilitating the advancement of the tunneling device and includes improved means in connection with the tunneling shield for making the tunnel wall as the shield is advanced through the earth, and this invention has reference to devices of the class shown and described in my application filed July 3rd, 1917, Serial No. 178,499.

In constructing tunnels it is customary to use a tunneling head or shield containing the workmen and having controlled openings in the front wall through which access is had to the earth ahead of the tunneling device and through which the earth is removed to clear the way for advancing the tunneling shield. The tunnel wall is built as the tunneling device is advanced and there are jacks around the wall of the shield which are adapted to bear against the end of the tunnel wall and by such engagement force the tunneling shield forward. In devices heretofore constructed the shield is made with a straight front wall and when the device is operating in a strata of loose earth, such as sand or similar material, great difficulty has been experienced owing to the fact that the material caves in and refills the space cleared away in front of the tunneling shield, as fast as the material is removed, and not only greatly delays the progress of the work and leaves unfilled pockets around the wall of the tunnel, but if the strata of loose material is quite extensive it may entirely prevent further progress of the work.

In my device I have provided a tunneling head or shield with a front wall which slopes rearwardly and outwardly from the axis or center of the front wall so as to apply a lateral pressure to the earth or material with which it is forced in contact. This construction enables the work to be effectively performed in any character of earth and has the advantage in sand and loose material of a spreading action which enables the device to force its way therethrough and holds the loose material outwardly and prevents the usual caving or filling in of such material ahead of the wall and also insures a firm wall of earth around the completed tunnel.

My device also comprises a permanent wall structure for the tunnel having sectional reinforcing members extending longitudinally thereof and imbedded therein, against which pressure is applied for advancing the tunneling head to insure a substantial bearing and prevent damage to the completed walls, and the tunneling device is also provided with means to facilitate the construction of the tunnel wall as the tunneling head is advanced.

It is an object therefore of my invention to provide a tunneling head or shield which is constructed to prevent loose sand or similar earth from obstructing the progress of the work.

It is another object of my invention to provide a tunneling shield or head with a front wall which slopes rearwardly and outwardly from the center thereof so as to impel the material with which it comes in contact laterally, and provided with closed openings in the wall through which the material may be removed from in front of said wall to permit the tunneling shield to be moved forward.

Another object of my invention is to provide a tunneling shield having an annular compartment at the rear end thereof to serve as a form or mold for constructing the permanent wall of the tunnel.

Another object of my invention is to provide a tunneling head or shield with a plurality of plungers for impelling the shield forwardly, and a tunnel wall at the rear thereof having a plurality of sectional reinforcing members extending longitudinally in line with the plungers of the tunneling shield to provide a substantial bearing against which the plungers are adapted to bear to advance the shield.

Another object of my invention is to provide a tunneling shield with an annular compartment forming a mold at the rear thereof accessible from the interior of the shield whereby the material of which the wall is constructed may be placed in position.

My invention has also other important objects which will appear from the following specification and the accompanying drawings in which I have described and illustrated my invention in a preferred form.

My invention may be provided in a tunneling head or shield having any form in cross-section but for the purpose of illustration it is shown herein in connection with a circular head or shell having an outer wall composed of the sections 1, 2 and 3, arranged end to end and rigidly secured together, the section 1 of which extends forwardly and serves as a cutting edge and the latter of said sections numbered 3, extends rearwardly and serves in part to provide a form in which the concrete or other material of which the tunnel wall is made is placed, whereas the intermediate section 2, provides for spacing to give ample room for workmen in the tunneling head, and also to provide a compartment for jacks or plungers for advancing the head. Inside and spaced from the sections 2 and 3, is an inner wall or drum 4, providing an annular space between the walls of approximately the thickness of the finished wall of the tunnel and there is a circular partition 5, dividing this annular space into two circular compartments, the rear one of which, indicated at 6, serves as a casing in which to pack the material of which the tunnel wall is made, and to retain the material till it has hardened sufficiently to serve as the wall, and the other compartment 7, is strongly reinforced by means of braces and plates 8 and 9 respectively and has a series of hydraulic or otherwise operated jacks 10, arranged therein around the circumference of the drum and provided with plungers 11, which project through the partition 5, and have an enlarged head 12, which is adapted to be forced against the end of the finished wall of the tunnel for moving the tunnel head forwardly.

Figure 1:
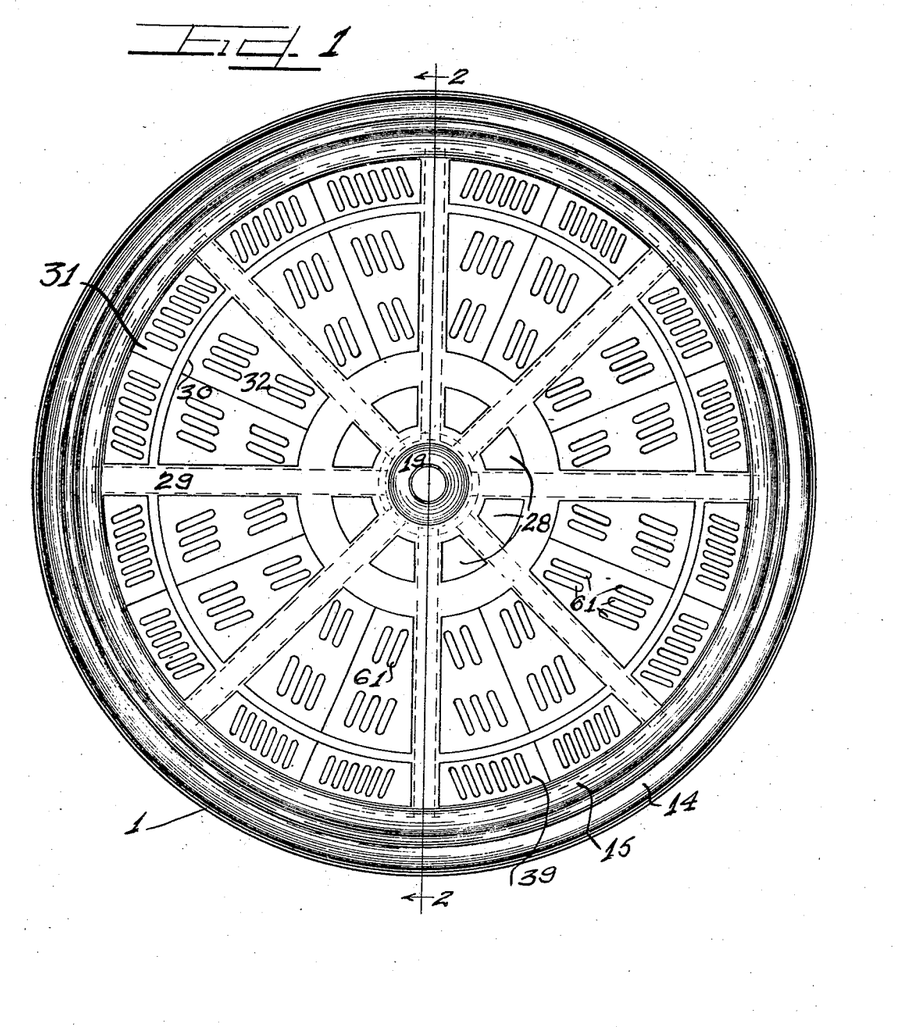
Figure 1 is a view looking at the front end of the tunneling device.
Figure 2:
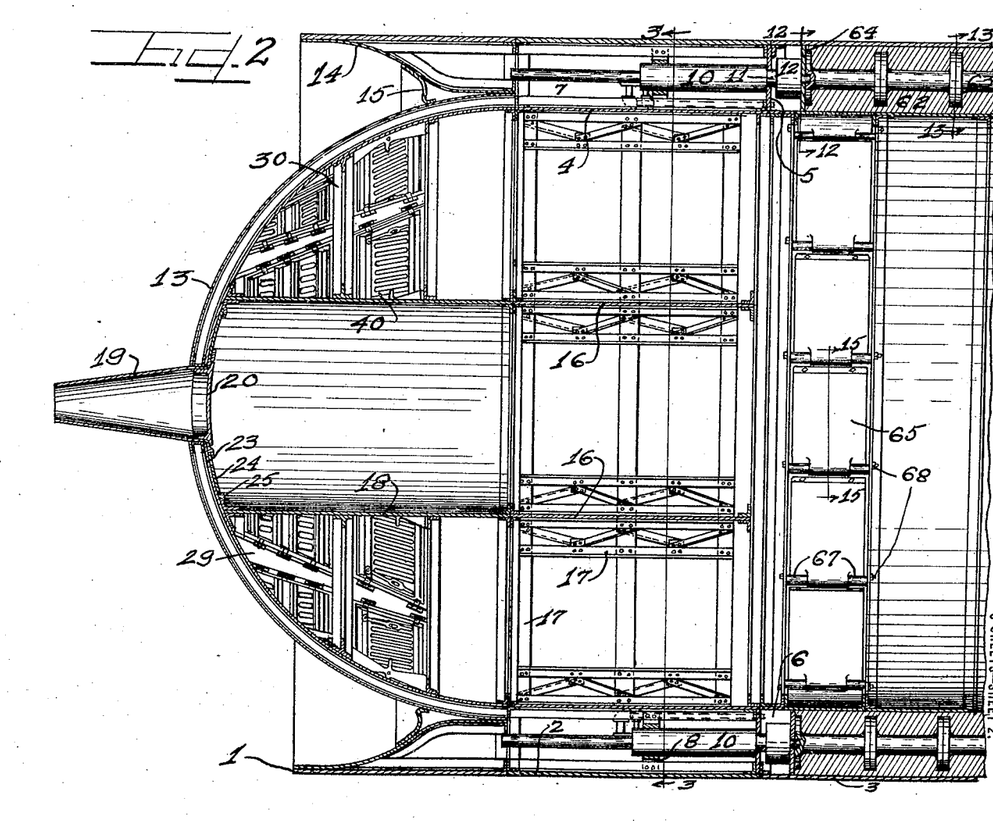
Figure 2 is a sectional view on the line 2—2 of Figure 1.
Figure 3:
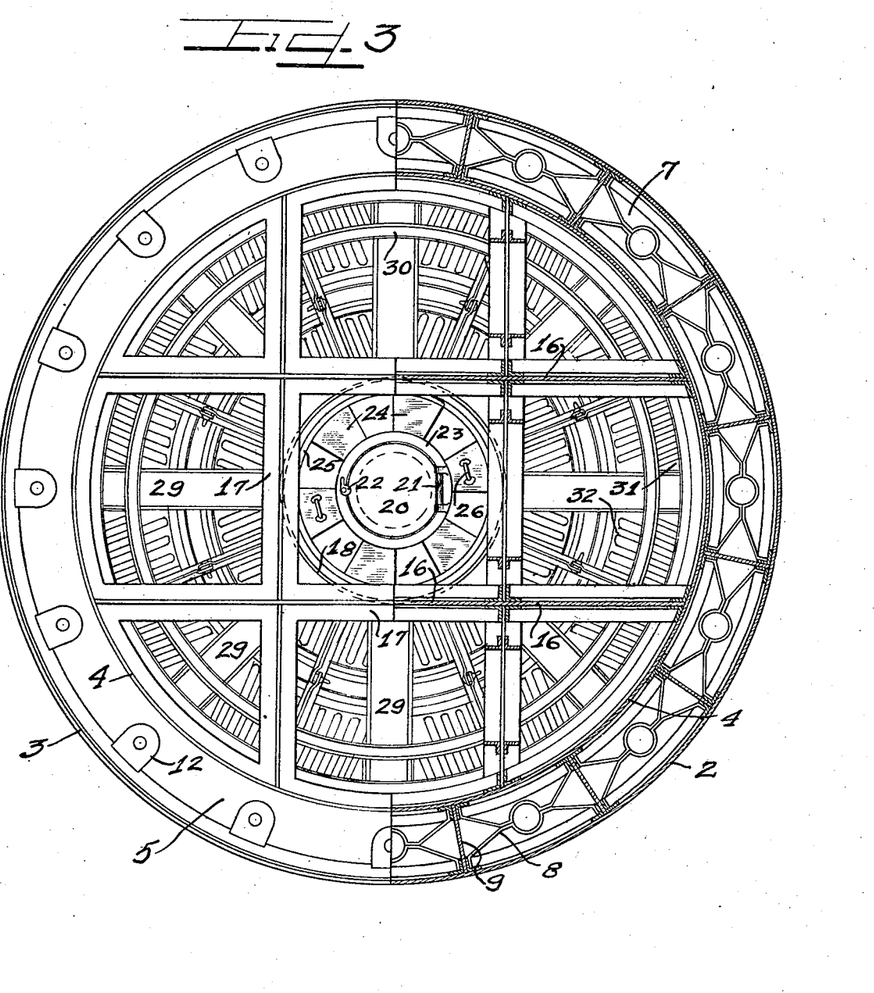
Figure 3 is a view part of which shows a rear elevation of the device and part a sectional view on the line 3—3 of Figure 2.
Figure 4:
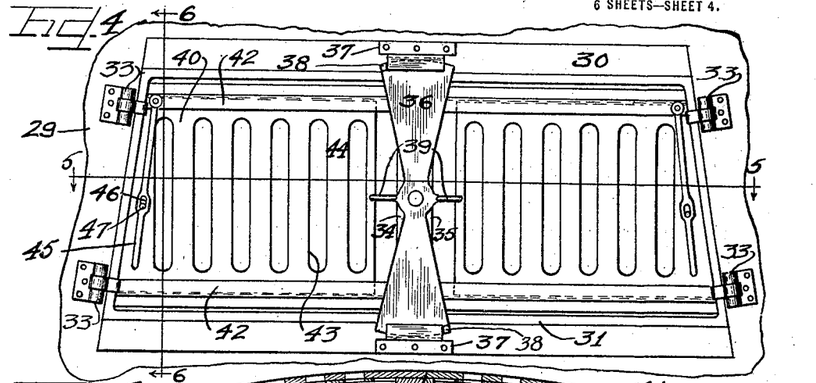
Figure 4 is a plan view of a fragmentary portion of the front wall and the doors for closing the opening in same.
Figures 5, 6, 7, 8:
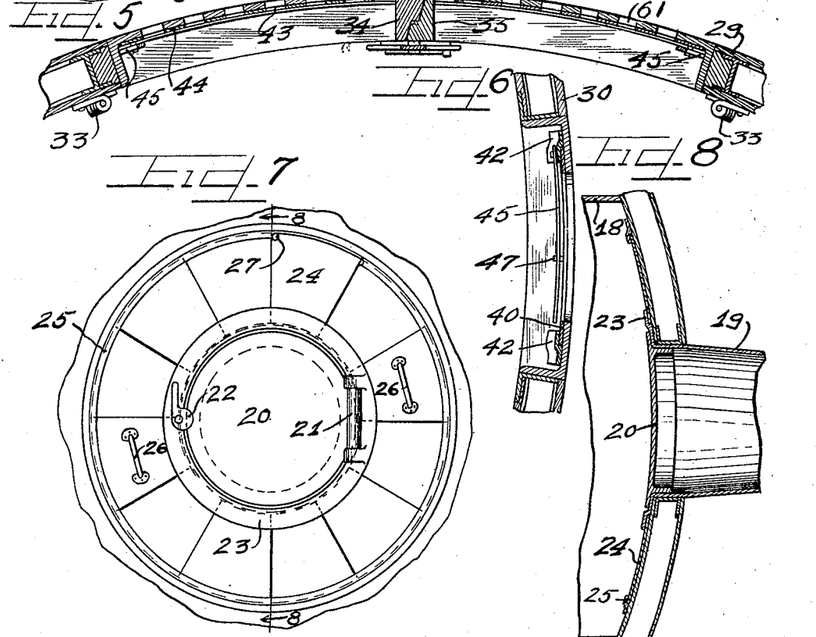
Figure 5 is a sectional view on the line 5—5 of Figure 4.
Figure 6 is a sectional view on the line 6—6 of Figure 4.
Figure 7 is an inside view of the central portion of the front wall of the device.
Figure 8 is a sectional view on the line 8—8 of Figure 7.
Figures 9, 11:
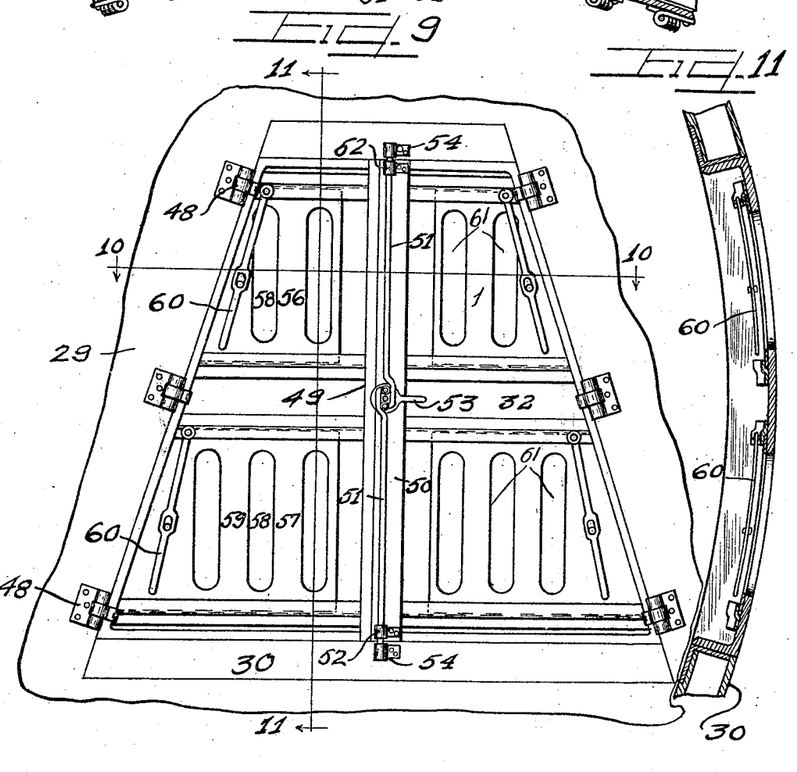
Figure 9 is an inside view of a fragmentary portion of the front wall and doors for closing the opening in same.
Figure 11 is a sectional view on the line 11—11 of Figure 9.
Figure 10:
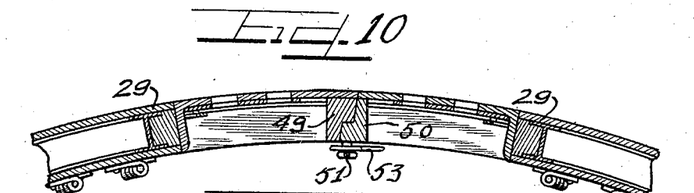
Figure 10 is a sectional view on the line 10—10 of Figure 9.

The forward end of the drum 4, is closed by a semi-spherical wall 13, which extends forwardly therefrom, and there is a flaring ring 14, extending forwardly from the outer edge of the wall 13, to the forward edge of the section 1, as shown in Figure 2, said ring and section 1, being firmly united and reinforced, and there is a dished ring 15, seated between and connecting the walls 13 and 14, to reinforce the structure and direct material towards the openings in the wall 13, and to prevent pocketing of material in an inaccessible place between the walls 13 and 14.

The portion of the shield within the section 2, is strongly reinforced by means of vertical and horizontal braces 17, so as to provide sufficient strength to withstand external pressure, said braces being spaced and provided with the floors 16, so that the work may be carried on at a number of levels, and there is a drum 18, arranged axially of the shield and extending forwardly from the frame work 17, to the extreme forward portion of the wall 13, and secured to the framework and wall for reinforcing purposes and also to provide a passageway to the openings at the center of the front wall. Projecting forwardly from the wall 13, at the center of the drum 18, is a tapered tube 19, which is open at the outer end and closed at the rear end by means of the door 20, which is hinged at 21, so as to swing inwardly and is held closed by means of an eccentric latch 22, which is pivoted on the wall so as to engage over the edge of the door. This projecting tube serves to center the device as it is moved forwardly and imparts an initial sidewise pressure to the earth, and also permits access to be had to material considerably in advance of the head to ascertain the nature thereof previous to the advancement of the head.

Surrounding the door 20, is a circular flange 23, which serves as the frame for the door and overlaps the inner edge of a circular shutter 24, the outer edge of which is engaged by a circular flange 25, adjacent the drum 18. The shutter 24, comprises a circular series of alternately arranged openings and plates, the latter of which are adapted to close a corresponding series of openings 28, in the front wall 13, at the end of the drum 18. Handles 26, are secured on the inner face of the shutter for rotating same to open or close the openings through the head and there is a pin or lug 27, at the rim of the shutter engaging in an arcuate recess in the edge of the flange 25, to limit the movement of the shutter 24.

The front wall 13, intermediate of the drum 18, and the ring 15, consists of a skeleton frame comprising the radial members 29, and circular cross braces 30, forming an inner and outer circular row of openings which are closed by the doors 31 and 32 respectively.

The doors 31, which close the outer row of openings, are arranged in pairs hinged at 33 on opposite sides of the opening so as to swing inwardly and the inner edges thereof meet when the doors are closed. One of the doors is provided along its inner edge with a shouldered cleat 34, having a beveled edge, and the other door is provided with a cleat 35, which is oppositely shouldered and beveled so as to overlap the cleat 34, and there is a locking plate 36, which is pivoted at its center to the cleat 35 midway of the length thereof, and has the ends extended beyond the sides of the door so as to engage under the latch members 37, on the frame of the wall 13, to hold the door closed. There is a lug 38 at each end of the plate 36 adapted to engage the latch members 37, to prevent movement of the plate 36, beyond the locking position and there are a pair of arms or handles 39, at the center of the plate 36, to assist in turning it on its pivot. The plate 36, being mounted on the cleat 35, which when the doors are closed overlaps the cleat 34, on the other door serves to lock both doors in a closed position when engaged with the plates 37.

These doors 31, are each provided with a plurality of slots 39 extending crosswise thereof and a plate 40, is mounted to slide in guides 42, on the inner face of the door and is provided with slots 43, which may be made to register with the slots in the door, and has strips 44 intermediate of the slots 43 so that the slots in the door may be opened and closed by sliding the plate 40 in the guides 42. For operating the plate 40, there is a lever 45, pivoted at the hinge end of each door and having a slot 46, therein engaged by a pin 47, on the sliding plate 40, so that as the lever 45, is swung on its pivot to or from the inner end of the door, the plate 40 is operated to open or close the slots in the door. These doors and also the other doors with which the wall is provided conform to the curvature of the wall so as to serve to impel laterally or radially from the axis or center of the tunneling head, the material with which they are brought into engagement, and the slotted doors are provided so that limited openings may be provided by opening the slot to a greater or less extent to permit access to the material at the front of the tunneling head, or the doors may be entirely opened to permit unrestricted access to the material at the front of the tunneling head, if the material is of sufficient stability and greater access is desired.

The doors 32, which close the intermediate circular series of openings are similar to the doors 31, except as to form and such changes as are necessitated by the difference in the shape of the openings which they are adapted to close. These doors are hinged as at 48, to the radial members 29, of the front walls so as to open inwardly, and have the inner edges thereof adapted to fit together when closed and provided with the overlapping cleats 49 and 50, similar to those employed on the doors 31, the latter cleat having the rods 51, mounted thereon in bearings 52, said rods being connected at their inner ends with a pivoted lever 53, whereby the outer ends of the rods 51, may be projected beyond the edges of the door or withdrawn by operating the lever 53. A socket bracket 54, is secured to the door casing in position to be engaged by the outer ends of the rods 51 when projected outwardly, and when engaged thereby hold the cleat 50 in position overlapping the cleat 49, and the pair of doors 32 accordingly closed. This locking mechanism is employed in preference to that used in the doors 31, owing to the length of the distance from end to end of the door, and for the same reason each door is provided with a pair of sliding plates 56 and 57 having the slotted openings 58 and intermediate portions 59, which are operable in the same manner as the plates of the doors 31, by means of the hand lever 60, to close the slots 61, in the door 32.

The tunnel wall, indicated at 62, in Figure 2, is made in successive rings as the tunneling head is advanced, which rings however, are joined and combined with the portion of the wall previously made so as to result in a unitary structure, and there are series of spool shaped abutment members 63, arranged end to end therein and lengthwise of the tunnel wall and in direct alignment with each plunger 11, of the hydraulic ram or jack 10.

In the operation of the device the earth is removed from the front of the wall 13, through the slots in the doors or by opening the doors themselves, and pressure is applied by means of the jacks 10, against the plate 64, which is interposed between the plunger 12, and the forward end of the abutment members 63, so that the tunneling head is moved forward by such pressure a distance corresponding to the amount of material removed from in front of the wall 13, or if the device is operating in loose material it will move forwardly and press the material outwardly by means of the rounded wall 13, until the material is prevented from further lateral movement by being packed tight in all crevices or openings adjoining the position of the tunneling head.

The tunneling head after moving forwardly a distance equal to the length of the reinforcing member 63, which distance is substantially the length of stroke of the jack 10, is then permitted to remain stationary while the section of concrete is placed in position, after which it is again moved forward a similar distance to permit the wall to be built up step by step. The advance of the tunneling head the distance required for the making of a section of the tunnel wall is not necessarily accomplished in a single operation. An amount of earth may be removed from in front of the wall 13, and the tunneling head advanced slightly and this operation repeated until the head is advanced a sufficient amount, or as may be the case when operating in loose earth, the pressure may be continuously applied and material removed here and there through the front wall of the device, under which condition the head will tend to advance and immediately occupy the space as fast as material is removed in front of the wall 13, and will thus prevent the material from caving in to any extent.

After the head has been advanced a sufficient amount for the making of a section of the permanent wall the plunger heads 12, are withdrawn as are also the plates 64. The inner wall 4, of the casing of the device is provided, directly in front of the space from which the plunger head has been withdrawn, and immediately ahead of the completed wall section 62, with a plurality of doors 65, arranged close together and extending entirely around the inside of the drum 4, which doors may be opened to permit access to the space ahead of the finished wall 62. These doors are hinged at one end as at 66, to connectors 67, which are interposed between and connect the spaced sections of the drum 4, by means of the bolts 68, so as to securely unite the sections and said doors are provided with a perforation at the free end to admit a cap screw 69, which is threaded into the connector 67, to hold the door securely closed.

Figure 12:
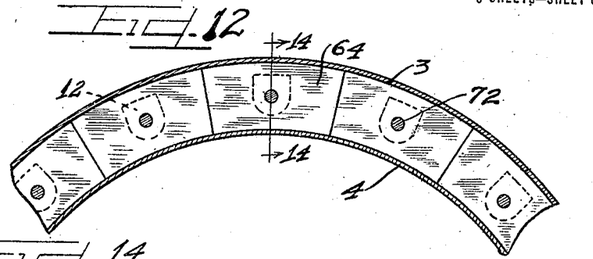
Figure 12 is a fragmentary sectional view on the line 12—12 of Figure 2.
Figures 13, 14:
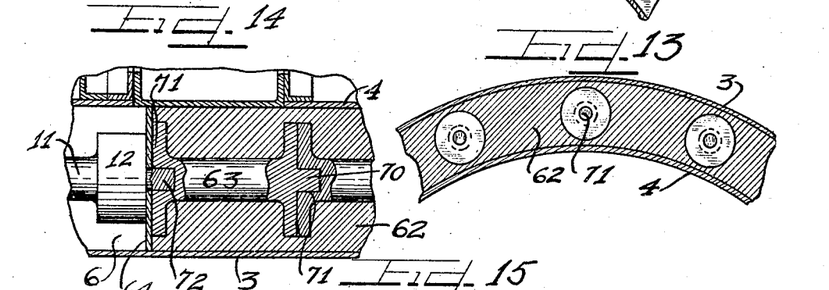
Figure 13 is a fragmentary sectional view of the tunnel wall on the line 13—13 of Figure 2.
Figure 14 is an enlarged sectional view on the line 14—14 of Figure 12.
Figure 15:
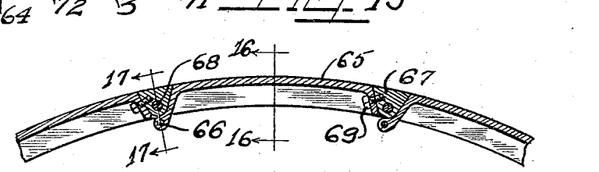
Figure 15 is a sectional view of the doors of the molding compartment taken on the line 15—15 of Figure 2.
Figure 16:
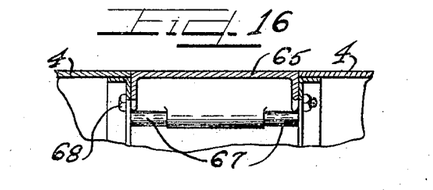
Figure 16 is a sectional view on the line 16—16 of Figure 15.
Figure 17:
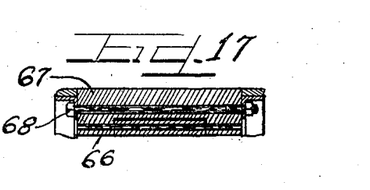
Figure 17 is a sectional view on the line 17—17 of Figure 15.

The abutment member 63 has an enlarged disk or head at each end as shown, and at one end has an axial projection 70, and at the other end an axial opening or socket 71 adapted to receive the projection 70 of the adjoining spool therein, and the plunger heads 12, are each provided with a correspondingly axial projection 72, to engage with a socket 71, in the abutment members. A plate 64, which fits closely between the inner and outer walls of the shell, is provided for each plunger head 11, and has a perforation to admit the projection 72, therethrough, and the plates 64 of adjoining plunger heads are arranged to have the edges thereof meet as shown in Figure 12 so that when arranged in the same plane they form a closed partition in front of the tunnel wall.

The abutment members 63, are imbedded in the tunnel wall with the socket or opening 71, at the inner end of the wall, and after the tunneling head has been advanced sufficiently, and the plunger heads 12, entirely withdrawn, the doors 65 are opened and abutment members 63 are placed in position with the projections 70 thereof in engagement with the sockets of the preceding abutment members 63, and the plunger heads 12, are then extended so that the projections 72 thereof engage the sockets 71, of the newly inserted abutment members and with the plates 64, thereof, clamped between the plunger heads 12, and the forward ends of the members 63. When a member 63 has thus been placed in position in front of each plunger, a circular compartment is provided ahead of the recently completed wall of the tunnel with members 63, arranged and held in proper position therein for the construction of another section of the wall. Concrete or other material of which the wall is made is then introduced into this annular chamber through the doors 65, after which the doors are closed and locked by means of the cap screws 69, to allow the material to set and the tunneling head is then ready for further advancement.

Inasmuch as the series of reinforcing members 63, bear the strain of the pressure applied by the jacks 10, it is not necessary for the tunneling head to remain inactive until the recently constructed portion of the wall is entirely hardened, and this not only avoids delay in the progress of the work but also permits succeeding sections of the concrete to be applied before the previous section has entirely hardened and enables the concrete of adjoining sections to thereby combine into a unitary mass. In order to protect the newly constructed portions of the wall as the tunneling head is advanced, the outer and inner walls of the shell are extended rearwardly a sufficient distance not only to cover the sections in which the concrete is applied but also a preceding section or more as may be required to serve as a form to hold and reinforce the concrete wall until it has become entirely hardened.

It is to be understood that the structure shown herein is adapted for the making of a tunnel of somewhat large capacity, and that in the making of tunnels of a different form or size I contemplate that the requisite changes and modifications in the general structure and arrangement of the parts will be accordingly made and my improvements embodied therein in the manner which may be advisable in view of the changed structure. It is necessary that the workmen shall have access to the various doors in the front wall of the tunneling head and also to the doors of the compartment within which the tunnel wall is molded and that provision be made for carrying the earth which is removed through the front wall of the device out through the completed tunnel. In the structure herein shown the intermediate portion of the tunneling head is provided with the floors 16, for the workmen, and in using the device scaffolding or platforms either temporary or permanent in form may be provided in connection with the floors 16, to give the workmen access to the various parts of the tunneling head as may be required.

I have shown my invention, for the purpose of illustration, in a certain form, but I do not purpose limiting the patent granted hereon otherwise than necessitated by the prior art.

I claim as my invention:

1. In a device of the class described the combination of a tubular casing, a wall closing one end of the casing and sloping laterally and rearwardly to the outer wall of the casing for deflecting material engaged thereby, said wall being provided with a plurality of openings permitting access from the interior of the casing to the material in front of the wall, means for closing the said openings, a marginal flange at the forward end of the tubular casing spaced from and surrounding the sloping front wall of the casing, and means arranged annularly at the rear end of one casing for moving the casing forwardly.

2. In a device of the class described the combination of a tubular casing, a front wall sloping laterally and rearwardly from the axis thereof, a tubular member projecting forwardly from the forward extremity of said wall, a door for said tubular member, a plurality of openings in the said wall encircling the tubular member, and adjustable means for closing the said openings.

In testimony whereof I have hereunto subscribed my name in the presence of two subscribing witnesses.

CORNELIUS G. HASTINGS.

Witnesses:
 FRANK A. BREMER, Jr.,
 FRED E. PAESLER.